(12) United States Patent
Nakai et al.

(10) Patent No.: US 7,492,993 B2
(45) Date of Patent: Feb. 17, 2009

(54) MULTI-PORT COUPLER, OPTICAL AMPLIFIER, AND FIBER LASER

(75) Inventors: Michihiro Nakai, Sakura (JP); Tetsuya Sakai, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/755,681

(22) Filed: May 30, 2007

(65) Prior Publication Data

US 2007/0280597 A1 Dec. 6, 2007

(30) Foreign Application Priority Data

May 30, 2006 (JP) ............... 2006-149696
Sep. 26, 2006 (JP) ............... 2006-260881

(51) Int. Cl.
G02B 6/26 (2006.01)
(52) U.S. Cl. ............... 385/46; 385/15; 385/31; 385/39
(58) Field of Classification Search ............... 385/15, 385/39, 46, 31
See application file for complete search history.

(56) References Cited

U.S. PATENT DOCUMENTS

| | | | |
|---|---|---|---|
| 5,864,644 A | 1/1999 | DiGiovanni et al. | |
| 5,898,715 A | 4/1999 | LeGrange et al. | |
| 5,933,271 A * | 8/1999 | Waarts et al. | 359/341.31 |
| 5,999,673 A | 12/1999 | Valentin et al. | |
| 7,016,573 B2 | 3/2006 | Dong et al. | |
| 2005/0105854 A1 | 5/2005 | Dong et al. | |

FOREIGN PATENT DOCUMENTS

WO 2006076524 A2 7/2006
WO 2007107163 A1 9/2007

* cited by examiner

*Primary Examiner*—Jennifer Doan
(74) *Attorney, Agent, or Firm*—Sughrue Mion, PLLC

(57) ABSTRACT

A multi-port coupler for coupling an pumping light source to a cladding pump fiber for optical amplification, includes a central signal fiber and a plurality of pumping fibers arranged around the central signal fiber, the central signal fiber and the plurality of pumping fibers being unified and a front side is reduced in diameter, wherein an emitted light confining waveguide part is provided around a core of the signal fiber located at the center, and the emitted light confining waveguide part whose outer diameter is larger than that of the core has a higher refractive index than a cladding and a lower refractive index than the core and the emitted light confining waveguide part is formed continuously from a splicing point of the cladding pump fiber to a coupler front end branched into multiple fibers.

13 Claims, 9 Drawing Sheets

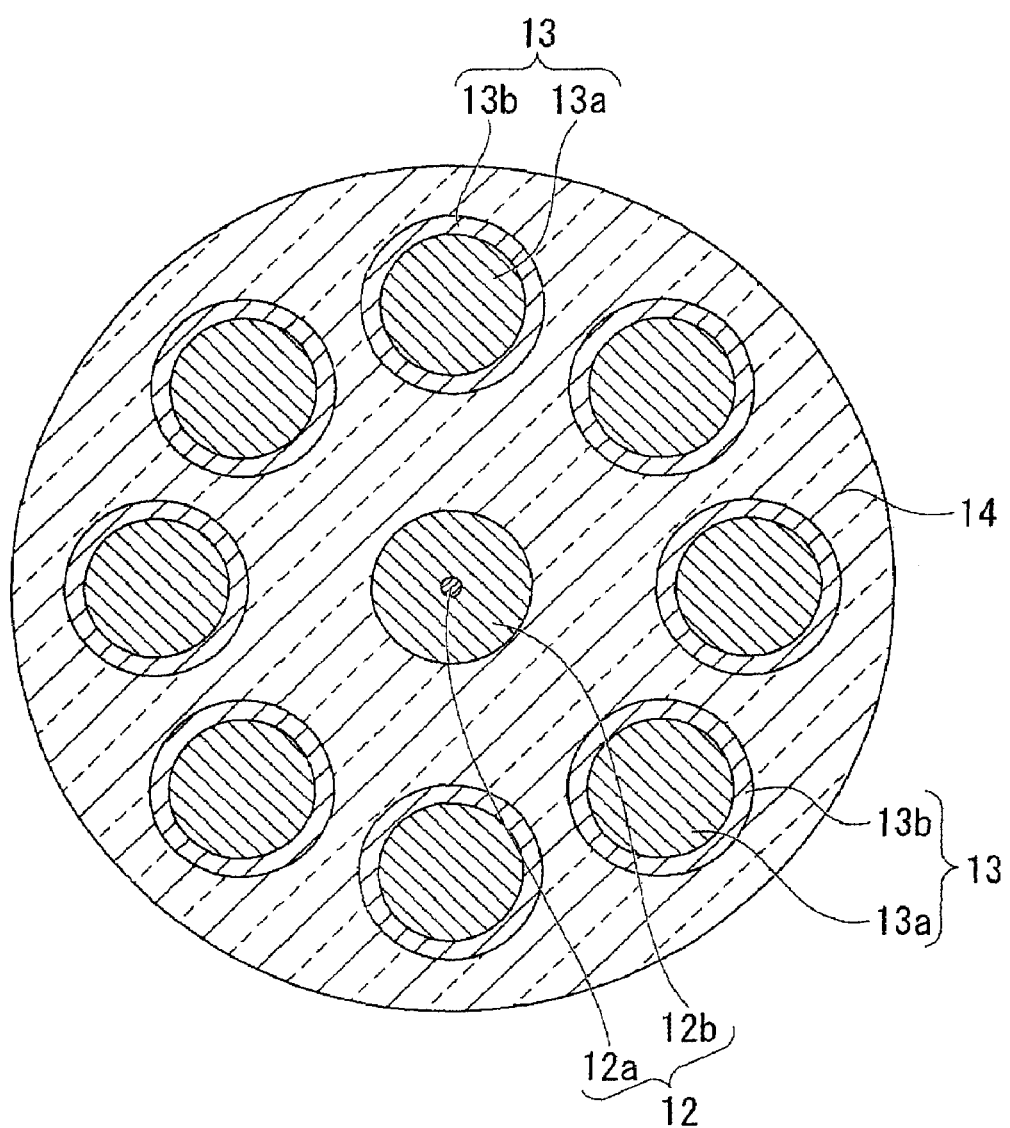

MULTI-PORT COUPLER, OPTICAL AMPLIFIER, AND FIBER LASER

BACKGROUND OF THE INVENTION

1. Field of the Invention

The present invention relates to a multi-port coupler for use in an optical fiber amplifier, a fiber laser, or the like for optical communications, particularly for short distance transmission systems, and an optical amplifier and a fiber laser using the same.

Priority is claimed on Japanese Patent Application No. 2006-149696 filed on May 30, 2006 and Japanese Patent Application No. 2006-260881 filed on Sep. 26, 2006, the contents of which are incorporated herein by reference.

2. Description of the Related Art

In general, a cladding pump structure is adopted in a high power optical amplifier, a fiber laser, and the like. This cladding pump structure supplies pumping light propagating through a cladding in order to amplify light propagating through a core of an optical fiber. The cladding pump structure is widely adopted and simultaneously a high power laser diode (hereinafter, referred to as LD) for multi-mode fiber output is used. A cladding pump fiber uses a double cladding structure having multiple cladding layers arranged around a rare earth element doped core.

To introduce light of a high power multi-mode LD into the cladding pump fiber, a multi-port coupler is used. The multi-port coupler has a function for coupling light of at least two multi-mode fibers to the cladding pump fiber and simultaneously connecting respective cores of the cladding pump fiber and a single-mode optical fiber (hereinafter, referred to as SM fiber) through which a conventional optical signal passes. The function of the multi-port coupler can obtain high power by connecting a number of LDs respectively having the power of only several watts (W) to the cladding pump fiber. A structure of an optical amplifier using the multi-port coupler is illustrated in FIG. 1.

An optical amplifier 21 of FIG. 1 is constructed to include a multi-port coupler 22 into which signal light and pumping light are incident and a cladding pump fiber 23 whose end is connected to an output terminal of the multi-port coupler 22. In the multi-port coupler 22, a signal fiber 25 constructed with a central SM fiber and pumping fibers 24 constructed with multi-mode fibers arranged around the signal fiber 25 are unified. A front side of the multi-port coupler 22 is reduced in diameter. The signal light and the pumping light can be incident into the cladding pump fiber 23 for optical amplification connected to a reduced-diameter output terminal of the multi-port coupler 22. Although not illustrated in FIG. 1, a signal light source is connected to the signal fiber 25 coupled to the multi-port coupler 22. LDs 10 are connected to the plurality of pumping fibers 24, respectively. The optical amplifier 21 excites rare earth ions doped into the core of the multi-port coupler 22 by propagating the pumping light (for example, a wavelength of 910-980 nm) to the cladding of the cladding pump fiber 23 through the multi-port coupler 22. The optical amplifier 21 amplifies incident signal light by propagating the signal light to the core of the cladding pump fiber 23 through the multi-port coupler 22, such that the amplified signal light (or high power signal) is output from the cladding pump fiber 23. In this type of optical amplifier, the gain level is 20 dB or more and the maximum power is 1 W-1 kW.

However, the lifetime of LDs 10 should be prolonged to improve reliability in a conventionally used optical amplifier in which a multi-port coupler and a cladding pump fiber are combined.

To prolong the lifetime of LDs, not only a high reliability design of the LD itself but also temperature management as a use condition is important. However, in the conventional optical amplifier, the LDs may suddenly fail according to use condition, thereby adversely affecting high reliability of the overall optical amplifier.

From the keen examination by the applicants, it has been found that an pump LD is suddenly damaged since high power signal light output from the optical amplifier returns from an external reflection point to the optical amplifier. Since the reflected light is inversely amplified while passing through the core of the cladding pump fiber and also light leaked into the cladding reaches the pump LD due to splice loss occurring in a splicing point between the cladding pump fiber and the multi-port coupler, the pump LD is damaged, thereby causing the failure. In particular, when the gain of the optical amplifier is 20 dB or more, the power of the light which is passed through the optical amplifier reaches more than 100% of it's own output power. When this strong reflected light, whose power can be ten times higher than that of the pump LD itself, goes backward into the LD, the LD is damaged.

To address this problem, the applicants have conducted research on a structure for preventing the pump LD from being damaged even when the reflected light returns to the optical amplifier.

On the other hand, an optical isolator is conventionally used in conventional technologies for suppressing the reflected light itself. However, there is a problem in that the optical isolator may attenuate the reflectance to only about −20 dB and also the optical isolator for light of several watts (W) or more is too expensive.

Since the reflected light propagates inside the core of the amplification fiber, the reflected light is not emitted to the pump LD as long as the light is not leaked from the core. According to the examination on how the reflected light is incident into the LD, it has been found that the reflected light is emitted to the pump LD due to the main cause of splice loss of the core caused at the splicing point of the multi-port coupler and the cladding pump fiber.

The loss in the splicing point occurs since core diameters (or intensity distribution sizes) of two fibers are very different from each other. In general, the high power cladding pump fiber has the core diameter of 20 μm or more. On the other hand, the core diameter of an SM fiber used for signal propagation is about 5 μm. For this reason, the magnitude of the loss in the splicing point becomes 5 dB or more, particularly in a propagation direction of the reflected light.

The reason why the core diameter of the cladding pump fiber is large is that the optical power density is very large in a high power amplifier and the optical fiber is affected by the non-linear optical effect. To avoid this influence, the core diameter of the cladding pump fiber is increased and consequently the low optical energy density in the fiber is designed. However, since multi-mode transmission is difficult and also bend loss is large in the core whose sectional area is large, the core is not proper for the signal fiber. Accordingly, it is desirable that the transmission fiber has a core whose sectional area is small and the amplification fiber has a core whose sectional area is large. Since the multi-port coupler is arranged between these two fibers, splice loss may be reduced to a certain degree if the sectional area of the core of the multi-port coupler has a middle size between the sizes of the sectional areas of the two fibers. It is obvious that the structure of the multi-port coupler increases the splice loss without decreasing the splice loss, since an outer diameter of a fiber in the multi-pump coupler is reduced to conventionally couple multiple fibers to one fiber.

FIGS. 2A and 2B illustrate a splicing point of the conventional multi-port coupler 22 and the cladding pump fiber 23 shown in FIG. 1. A front end of the multi-port coupler 22 connected to the cladding pump fiber 23 unifies a central signal fiber 25 having a core 26 and a plurality of pumping fibers 24 around the signal fiber 25, and has a structure in which the multi-port coupler 22 is reduced in diameter in a tapered shape toward an end so that an outer diameter of the multi-port coupler 22 can be the same as that of the cladding pump fiber 23. In the front end, the diameter of the core of the central signal fiber 25 is further reduced. When the cladding pump coupler 23 whose core has a large diameter is connected, a difference between the core diameters of fibers at both sides is further increased.

When the above situations are considered, it is actually difficult to reduce splice loss occurring in the splicing point of the multi-port coupler.

SUMMARY OF THE INVENTION

The present invention has been designed to address at least the above problems. An object of the present invention is to provide a multi-port coupler that can prevent an pumping light source from being damaged by reflected light in an optical amplifier or fiber laser using a multi-port coupler and that can prolong the lifetime of devices, and an optical amplifier and a fiber laser using the same.

To achieve the above and other objects, the present invention provides a multi-port coupler for coupling an pumping light source to a cladding pump fiber for optical amplification, comprising: a central signal fiber and a plurality of pumping fibers arranged around the central signal fiber, the central signal fiber and the plurality of pumping fibers being unified and a front side is reduced in diameter, wherein an emitted light confining waveguide part is provided around a core of the signal fiber located at the center, and the emitted light confining waveguide part whose outer diameter is larger than that of the core has a higher refractive index than a cladding and a lower refractive index than the core and the emitted light confining waveguide part is formed continuously from a splicing point of the cladding pump fiber to a coupler front end branched into multiple fibers.

In the multi-port coupler, the emitted light confining waveguide part may be provided in a concentric circle shape around the core of the signal fiber. In addition, the emitted light confining waveguide part may be provided with a section of a polygonal shape around the core of the signal fiber.

Moreover, the present invention provides a multi-port coupler for coupling an pumping light source to a cladding pump fiber for optical amplification, comprising: a central signal fiber and a plurality of pumping fibers arranged around the central signal fiber, the central signal fiber and the plurality of pumping fibers being unified using a capillary, the capillary being connected to a rear end of a bridge fiber along with the signal fiber and the pumping fibers, a front side of the bridge fiber being reduced in diameter, wherein an emitted light confining waveguide part is provided around a core of the bridge fiber, the emitted light confining waveguide part whose outer diameter is larger than that of the core has a higher refractive index than a cladding and a lower refractive index than the core, and the capillary whose refractive index is lower than that of a cladding of the signal fiber, the capillary having an effect of confining emitted light in the signal fiber.

Moreover, the present invention provides a multi-port coupler for coupling an pumping light source to a cladding pump fiber for optical amplification, comprising: a central signal fiber and a plurality of pumping fibers arranged around the central signal fiber, the central signal fiber and the plurality of pumping fibers being unified using a capillary, the capillary being connected to a rear end of a bridge fiber along with the signal fiber and the pumping fibers, a front side of the bridge fiber being reduced in diameter, wherein an emitted light confining waveguide part is provided around a core of the bridge fiber, wherein the emitted light confining waveguide part whose outer diameter is larger than that of the core has a higher refractive index than a cladding and a lower refractive index than the core, the capillary whose refractive index is equal to that of a cladding of the signal fiber, and an pumping fiber cladding whose refractive index is lower than that of the capillary, the pumping fiber cladding having an effect of confining emitted light in the signal fiber and the capillary.

In the multi-port coupler, the emitted light confining waveguide part may be provided in a concentric circle shape around the core of the bridge fiber. In addition, the emitted light confining waveguide part may be provided with a section of a polygonal shape around the core of the bridge fiber.

Preferably, in the multi-port coupler of the present invention, the outer diameter of the emitted light confining waveguide part may be smaller than that of the signal fiber connected to the multi-port coupler. In this invention, the shape of confining waveguide is not an essential factor. However, a simpler shape is preferable in terms of productivity.

Preferably, in the multi-port coupler of the present invention, an emitted light attenuation part may be provided in which the signal fiber is extended for an appropriate distance and rolled.

Moreover, the present invention provides an optical amplifier, including: the multi-port coupler of the present invention as described above; a cladding pump fiber for optical amplification; and an pumping light source.

Moreover, the present invention provides a fiber laser, including: the multi-port coupler of the present invention as described above; a cladding pump fiber for optical amplification; and an pumping light source.

As the multi-port coupler of the present invention is of a structure in which an emitted light confining waveguide part provided around a core of a signal fiber located at the center has an outer diameter which is larger than that of the core, a higher refractive index than a cladding and a lower refractive index than the core, reflected light returning to a laser diode (LD) is confined in the emitted light confining waveguide part, such that an pumping light source can be prevented from being damaged by the reflected light and the lifetime of devices can be prolonged.

As the optical amplifier of the present invention is of a structure in which pumping light and signal light are coupled to a cladding pump fiber for optical amplification using the multi-port coupler of the present invention as described above, reflected light returning to an LD is confined in an emitted light confining waveguide part of the optical amplifier, such that an pumping light source can be prevented from being damaged by the reflected light and the lifetime of devices can be prolonged.

As the fiber laser of the present invention is of a structure in which pumping light and signal light are coupled to a cladding pump fiber for optical amplification using the multi-port coupler of the present invention as described above, reflected light returning to an LD is confined in an emitted light confining waveguide part of the fiber laser, such that an pumping light source can be prevented from being damaged by the reflected light and the lifetime of devices can be prolonged.

BRIEF DESCRIPTION OF THE DRAWINGS

FIG. 6 is a cross-sectional view taken along cutting plane A-A of FIG. 5;

DETAILED DESCRIPTION OF THE INVENTION

Hereinafter, embodiments of the present invention will be described with reference to the accompanying drawings.

Figure 1:
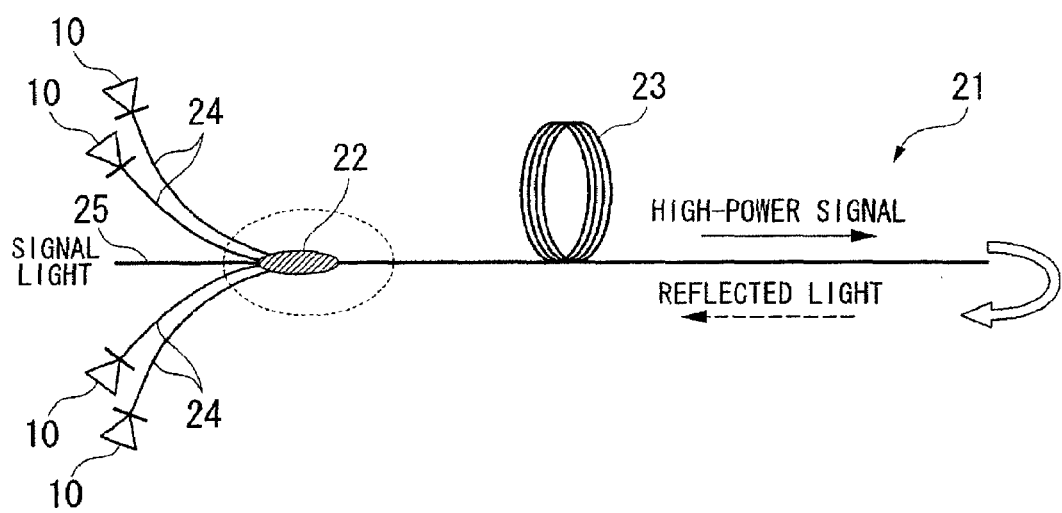
FIG. 1 is a structure diagram illustrating an example of an optical amplifier.
Figure 2A:
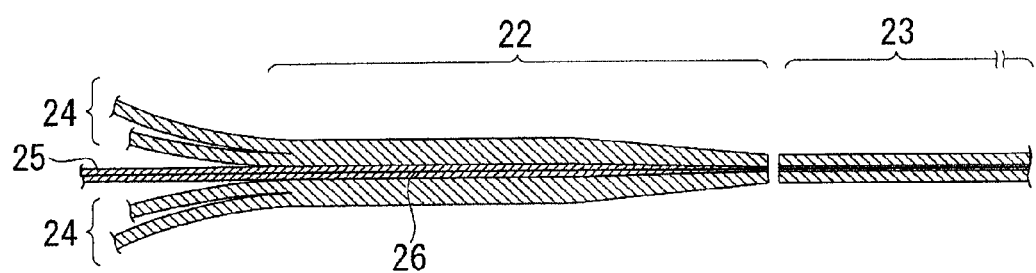
FIGS. 2A and 2B are cross-sectional views illustrating a structure of a multi-port coupler.
Figure 2B:
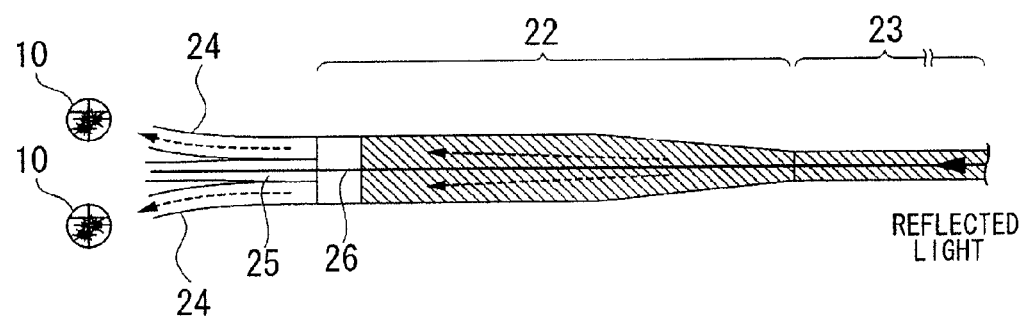
Figure 3A:
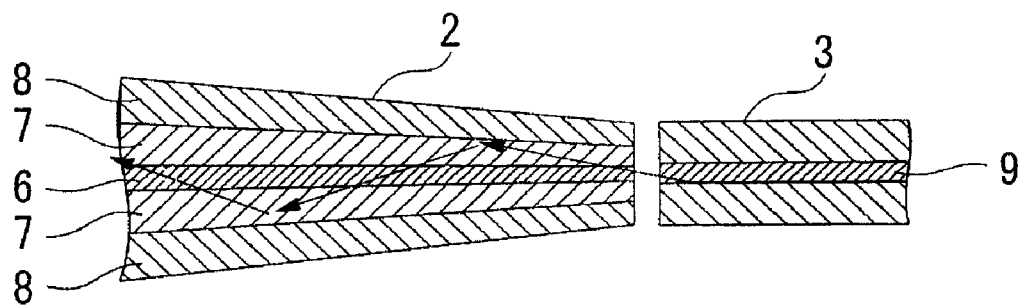
FIGS. 3A and 3B are cross-sectional views illustrating an embodiment of the multi-port coupler in accordance with the present invention.
Figure 3B:
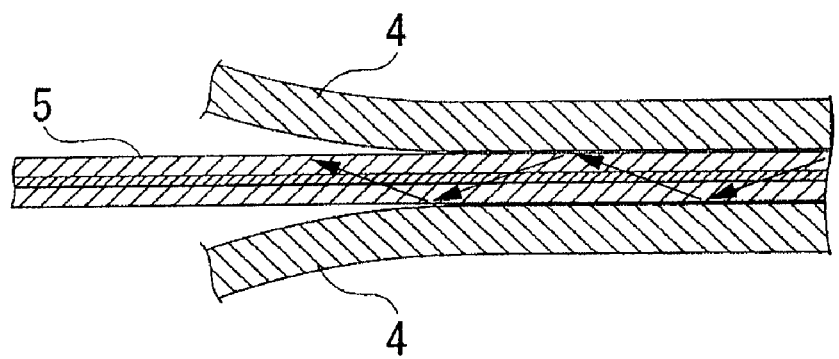

FIG. 3 is cross-sectional views illustrating an embodiment of a multi-port coupler in accordance with the present invention. FIG. 3A is a cross-sectional view illustrating a structure of a front side of a multi-port coupler 2 and FIG. 3B is a cross-sectional view illustrating a structure of the other end side of the multi-port coupler 2.

In the multi-port coupler 2 of this embodiment, a central signal fiber 5 and a plurality of pumping fibers 4 arranged around the central signal fiber 5 are unified. The front side of the multi-port coupler 2 is reduced in diameter. In the multi-port coupler for coupling an pumping light source to a cladding pump fiber 3 for optical amplification, an emitted light confining waveguide part 7 is provided in a concentric circle shape around a core 6 of the signal fiber 5 located at the center and has an outer diameter which is larger than that of the core 6. The emitted light confining waveguide part 7 has a higher refractive index than a cladding 8 and a lower refractive index than the core 6. The emitted light confining waveguide part 7 is formed continuously from a splicing point for the cladding pump fiber 3 to a coupler front end branched into multiple fibers 4 and 5.

The applicants have analyzed a mechanism in which a laser diode (LD) is damaged and have invented a structure in which no LD is damaged even when splice loss occurs in a multi-port coupler. The applicants have focused on an internal structure of the multi-port coupler.

In the multi-port coupler 2, the signal fiber 5 serving as the center and the plurality of pumping fibers 4 arranged around the signal fiber 5 are unified. It has been found that emitted light can be effectively confined in an area whose refractive index is high and therefore the emitted light can be prevented from entering an excitation port even when the splice loss occurs and externally emitted light is generated, if the emitted light confining waveguide part 7 formed around the core 6 of the signal fiber 5 as illustrated in FIG. 3 has a slightly higher refractive index than its periphery.

According to the examination, it has been found that a relative refractive index difference relative to the cladding 8 for the emitted light confining waveguide part 7 decreases as the diameter of the emitted light confining waveguide part 7 increases, whereas the relative refractive index difference increases as the diameter of the emitted light confining waveguide part 7 decreases.

In this case, it has been found that the effect of confining emitted light is uniformly achieved when the relationship of a diameter D of the emitted light confining waveguide part 7 and a relative refractive index difference A of the emitted light confining waveguide part 7 relative to the cladding 8 is varied by maintaining the relationship of the following Equation (1).

$$D [\mu m] * \Delta [\%] = \text{Constant } A \quad (1)$$

In this case, it is desirable to determine the constant value A according to how much leaked emitted light is confined. Further, the "A" value can vary with the core diameter of the cladding pump fiber 3 for optical amplification and the relative refractive index difference relative to the cladding, since the angle or intensity of emitted light is determined by the core 9 of the cladding pump fiber 3.

The emitted light confining waveguide part 7 should be provided from the splicing point of the cladding pump fiber 3 to an area in which the pumping fiber 4 is separated from the signal fiber 5, since the emitted light may be coupled to the pumping fiber 4 when the emitted light is unable to be confined on the way.

It is preferable that the diameter of the emitted light confining waveguide part 7 is smaller than the outer diameter of the cladding of the signal fiber 5, since the emitted light confined within the waveguide is coupled to the pumping fiber 4 at a coupler front end if the diameter of the emitted light confining waveguide part 7 is larger than the outer diameter of the cladding of the signal fiber 5.

When the emitted light confined in the emitted light confining waveguide part 7 is propagated through the signal fiber 5 in reverse as illustrated in FIG. 3B, the emitted light is gradually absorbed and vanished by a resin outside a glass cladding. To actively accelerate the absorption, it is desirable to roll the signal fiber 5 in a uniform curvature range over an appropriate length. For example, it is preferable that the signal fiber has the φ diameter of 50 mm and the length of about 1 m.

When it is difficult to use an appropriate length fiber, the emitted light can be absorbed by addition of a dopant for enabling the emitted light to be absorbed by a cladding part. For example, an Sm doped fiber is effective to absorb the light with a wavelength of 1064 nm.

Next, the advantageous effects will be described when the emitted light confining waveguide part 7 is provided in the multi-port coupler 2 of this embodiment.

For example, when the cladding pump fiber 3 in which the core diameter is 20 μm and the relative refractive index difference between the core and the cladding is 0.1% is connected to the multi-port coupler 2 in which the core diameter of an end is 2.5 μm and the relative refractive index difference between the core and the cladding is 0.4%, A=3 [μm*%], such that 92% of the emitted light can be confined and externally emitted light can be set to about 8%. In this case, in an example of a refractive index distribution of the multi-port coupler 2, the relative refractive index difference between the core and the emitted light confining waveguide part is 0.4%, the relative refractive index difference between the emitted light confining waveguide part and the cladding is 0.05%, and the diameter of the emitted light confining waveguide part is 60 μm. This embodiment is advantageous in that reflected light can be reduced to 4 W if reflected light of about 50 W returns in a state in which no action is taken.

Since the pump LD is damaged by power at least twice as high as the output power of the pump LD itself in the case where the pump LD is conventionally damaged, the effect of reduction to 8% is very large. Conventionally, the excitation power is about 5-10 W.

If A=1.5 [μm*%], 85% of the emitted light can be confined in the same case. For example, in the case where the pump LD is damaged by the reflected light of 20 W, the reflected light is reduced to 15% of 20 W, that is, 3 W, and also the pump LD can be effectively protected.

In addition, the multi-port coupler 2 of this embodiment can efficiently gather pumping light in a core 9 of the cladding pump fiber 3 by providing the emitted light confining waveguide part 7 around the signal fiber 5. In the case of optical amplification by the cladding pump fiber 3, it is very important that the pumping light uniformly distributed to the cladding is efficiently absorbed by the core 9. If the pumping light can be gathered in the core 9, the pumping light can be efficiently absorbed (since the absorption happens only in the core). For example, if the emitted light confining waveguide part 7 having the relative refractive index difference of 0.1% in the diameter of 50 μm is provided around the core of the signal fiber 5, the core 9 of the cladding pump fiber 3 increases the absorption efficiency of the pumping light by 20%.

Figure 4A:
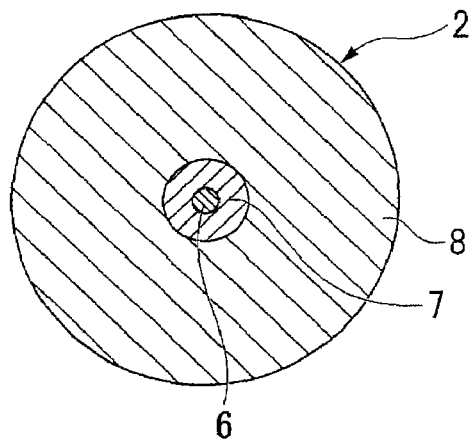
FIG. 4A is a cross cross-sectional view illustrating the multi-port coupler of FIG. 3.
Figure 4B:
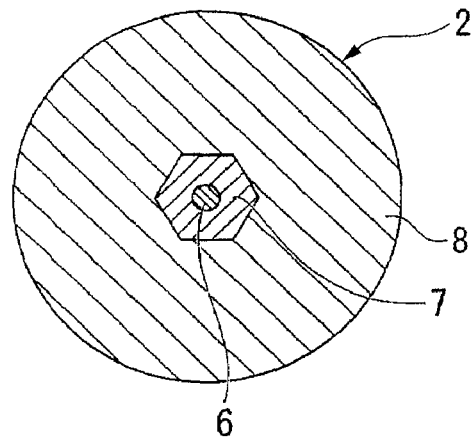
FIGS. 4B to 4D are cross-sectional views illustrating examples in which an emitted light confining waveguide part is modified in polygonal shapes.
Figure 4C:
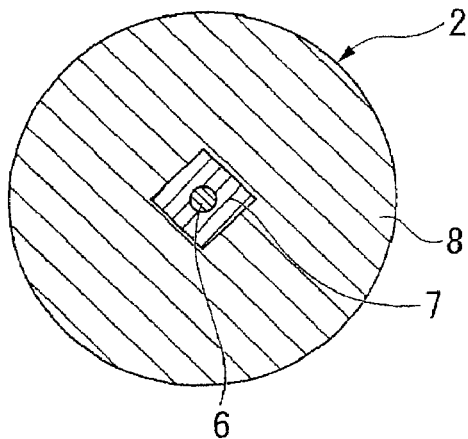
Figure 4D:
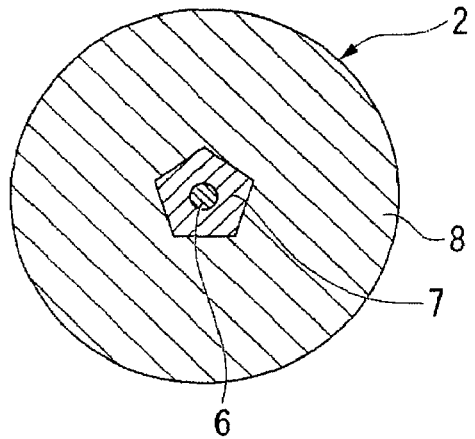

In the case of the multi-port coupler 2 as illustrated in FIG. 3, the core 6 of the signal fiber and the emitted light confining waveguide part 7 provided around the core 6 have a section of a concentric circle shape as illustrated in FIG. 4A. However, the present invention is not limited to the emitted light confining waveguide part 7 of FIG. 4A. The emitted light confining waveguide part 7 can have a section of a polygonal shape such as a hexagonal shape as illustrated in FIG. 4B, a square shape as illustrated in FIG. 4C, or a pentagonal shape as illustrated in FIG. 4D. Also in the case where the sectional shape of the emitted light confining waveguide part 7 is the polygonal shape, reflected light can be confined in the signal fiber 5 and power incident into the pumping fiber 4 can be reduced as in the concentric circle shape.

If the outer diameter of the emitted light confining waveguide part 7 is smaller than the outer diameter (or cladding diameter) of the signal fiber 5 connected to the multi-port coupler 2 when the section of the emitted light confining waveguide part 7 has the polygonal shape, it means that the diameter of an inscribed circle of the emitted light confining waveguide part 7 is smaller than the outer diameter of the signal fiber 5. As the emitted light confining waveguide part 7 is included within a cladding area of the signal fiber 5 in a total sectional area, a whole of emitted light confined within the emitted light confining waveguide part 7 is supplied to the signal fiber 5 and a coupler front end controls the emitted light to be supplied to the pumping fiber 4, so that the same desired effect can be achieved.

The pump LD can be effectively prevented from being damaged by reflected light and also pumping light can be efficiently distributed around a core, by providing an area in which light is confined around the core in a waveguide structure inside the multi-port coupler as described above. In addition, the pumping light can be efficiently gathered around the core by adopting the above described structure.

Further, the multi-port coupler of the present invention can have a structure in which a signal fiber and pumping fibers are convergent in a capillary structure and a front end of the capillary structure is connected to a bridge fiber having a reduced-diameter front end and an emitted light confining waveguide part. Next, a second embodiment of the present invention will be described with reference to FIGS. 5 to 8.

Figure 5:
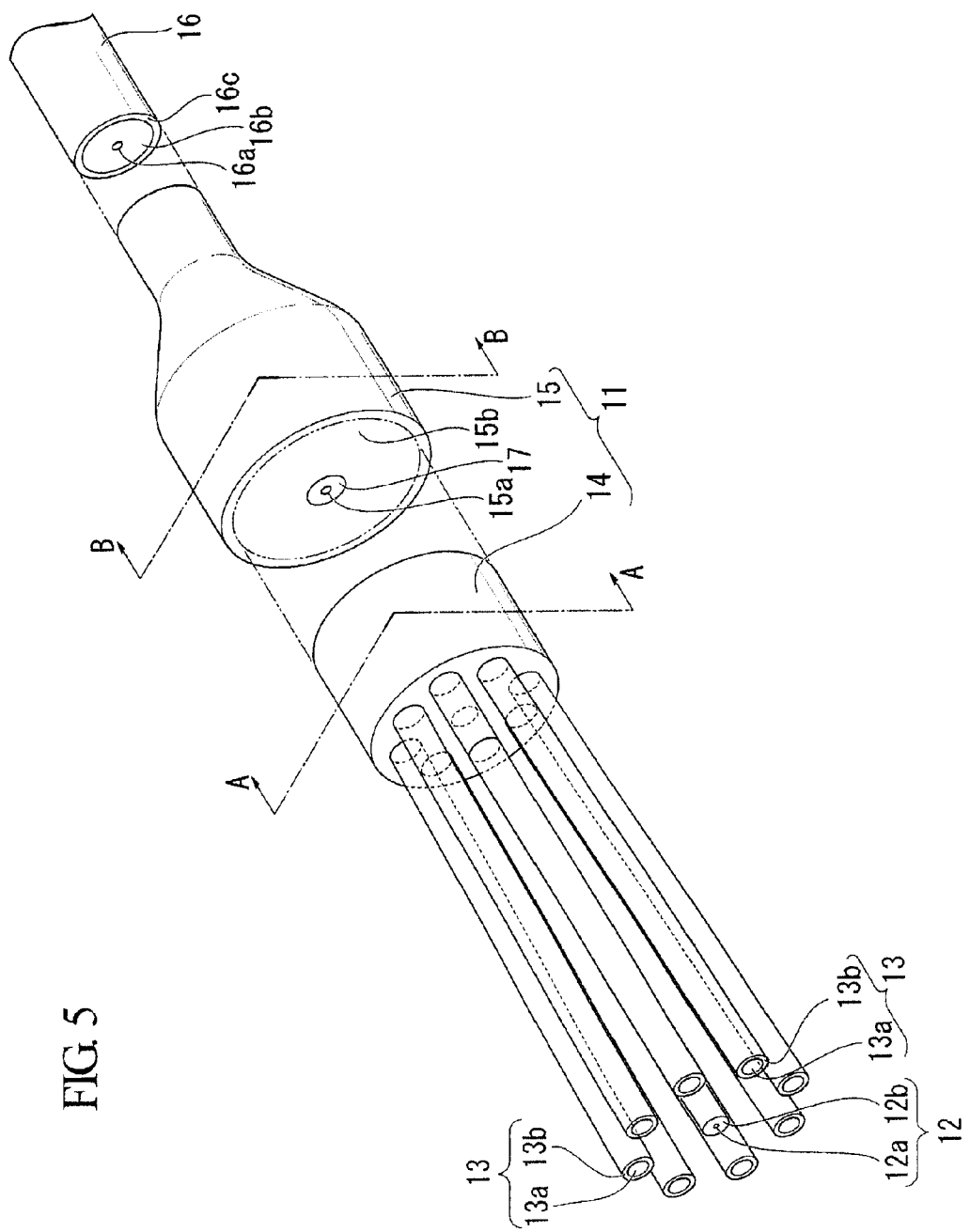
FIG. 5 is an exploded perspective view illustrating a second embodiment of the multi-port coupler in accordance with the present invention.

In a multi-port coupler 11 as illustrated in FIGS. 5 and 6, a central signal fiber 12 and a plurality of pumping fibers 13 arranged around the central signal fiber 12 are unified using a capillary 14. Along with the signal fiber 12 and the pumping fibers 13, the capillary 14 is connected to a rear end of a bridge fiber 15. A front side of the bridge fiber 15 is reduced in diameter (or not being changed in diameter). In the multi-port coupler 11 for coupling an pumping light source to a cladding pump fiber 16 for optical amplification, an emitted light confining waveguide part 17 is provided around a core 15a of the bridge fiber 15. The emitted light confining waveguide part 17 whose outer diameter is larger than that of the core 15a has a higher refractive index than a cladding 15b and a lower refractive index than the core 15a.

Herein, the capillary 14 is a porous capillary having multiple through holes (or fine pores) into which the signal fiber 12 and the pumping fibers 13 are inserted. It is preferable that the porous capillary is made of silica-based glass to which the quartz glass or dopant is added for fusion splicing fibers. For example, the fusion splice can be made using a thermal source such as arc discharging, carbon dioxide gas laser, oxyhydrogen flame, or the like. A core 12a of the signal fiber 12 inserted into a central fine pore of the capillary 14 is coupled to the core 15a of the bridge fiber 15. Cores 13a of the pumping fibers 13 inserted into fine pores around the central fine pore are coupled to the cladding 15b of the bridge fiber 15. A reduced-diameter part of the front side of the bridge fiber 15 can be formed, for example, through heating drawing in a tapered shape.

In the multi-port coupler 11, the following structures (1) and (2) are used to prevent reflected light from being incident into the pumping fibers 13.

(1) The refractive index of the capillary 14 is lower than that of the cladding 12b of the signal fiber 12. In this case, the capillary 14 has the effect of confining reflected light in the signal fiber 12. For this reason, the magnitude relation between the refractive indices of the capillary 14 and the cladding 13b of the pumping fiber 13 can be arbitrarily set and the refractive index of the capillary 14 can be higher or lower than or equal to that of the cladding 13b of the pumping fiber 13.

In this structure, an emitted light confining waveguide part is formed continuously from a splicing point of a cladding pump fiber 16 to a coupler front end branched into the multiple fibers 12 and 13 when the capillary 14 is aligned with the emitted light confining waveguide part of the bridge fiber 15 to perform a function of the emitted light confining waveguide part.

(2) The refractive index of the capillary 14 is equal to that of the cladding 12b of the signal fiber 12 and also the refractive index of the cladding 13b of the pumping fiber 13 is lower than that of the capillary 14. In this case, the cladding 13b of the pumping fiber 13 has the effect of confining emitted light in the signal fiber 12 and the capillary 14.

When splice loss occurs between the capillary 14 and the bridge fiber 15 in this structure, the emitted light can be coupled to the capillary 14, but the emitted light can be prevented from being coupled to the pumping fiber 13 since the cladding 13b of the pumping fiber 13 has the effect of confining the reflected light in the capillary 14.

In any one of the structures (1) and (2), it is desirable that the diameter (or outer diameter) of the emitted light confining waveguide part 17 provided in the bridge fiber 15 is smaller than the outer diameter (or cladding diameter) of the signal fiber 12, since the emitted light confined in the waveguide is coupled to the pumping fiber 13 at the coupler front end if the diameter of the emitted light confining waveguide part 17 is larger than the outer diameter of the signal fiber.

When the emitted light confined in the emitted light waveguide part 17 is propagated through the signal fiber 12 in reverse (or in a direction from the right to the left in FIG. 5), the emitted light is gradually absorbed and vanished by a resin outside of the cladding 12b of the signal fiber 12. To actively accelerate the absorption, it is desirable to roll the signal fiber 12 in a uniform curvature range over an appropriate length. For example, it is preferable that the signal fiber 12 has the φ diameter of 50 mm and the length of about 1 m.

When it is difficult to use the signal fiber 12 in an appropriate length, the emitted light can be absorbed by addition of a dopant for enabling the emitted light to be absorbed by a part of the cladding 12b of the signal fiber 12. For example, an Sm doped fiber is effective to absorb the light with the wavelength of 1064 nm. The advantageous effects will be described when the emitted light confining waveguide part 17 is provided in the bridge fiber 15 in the multi-port coupler 11 of this embodiment.

In the structure (2) in which the refractive index of the capillary 14 is equal to that of the cladding 12b of the signal fiber 12, all the cladding 12b of the signal fiber 12, the capillary 14, and the cores 13a of the pumping fibers 13 are made of quartz (whose refractive index is about 1.448). The cladding 13b of the pumping fiber 13 has the thickness of 10 μm in the refractive index of 1.436 (when the relative refractive index difference between the core 13a and the capillary 14 is 0.8%). In this case, the intensity of the reflected light coupled to the pumping fibers 13 can be reduced to about 20 dB (that is, about 1/100), in the structure (2) compared with a structure where a low refractive index part based on the claddings 13b of the pumping fibers 13 is not provided.

In the structure (1) in which the refractive index of the capillary 14 is lower than that of the cladding 12b of the signal fiber 12, all the cladding 12b of the signal fiber 12 and the cores 13a of the pumping fibers 13 are made of quartz (whose refractive index is about 1.448). The cladding 13b of the pumping fiber 13 has the thickness of 10 μm in the refractive index of 1.436 (when the relative refractive index difference between the core 13a and the capillary 14 is 0.8%) and also the capillary 14 has the refractive index of 1.436. In this case, the intensity of the reflected light coupled to the pumping fibers 13 can be further reduced by 8 dB in the structure (1) compared with the structure (2). In the structure (1) compared with a structure where no low refractive index part is provided, the reduction of about 28 dB can be achieved.

Figure 7A:
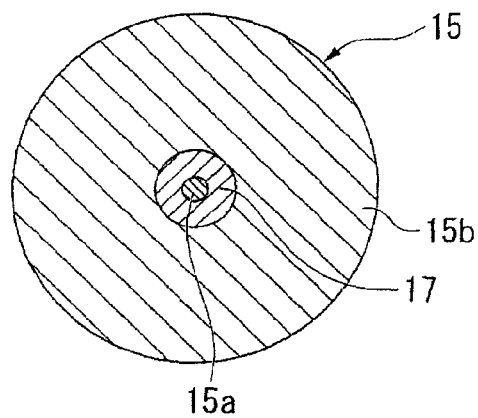
FIG. 7A is a cross-sectional view taken along cutting plane B-B of FIG. 5.
Figure 7B:
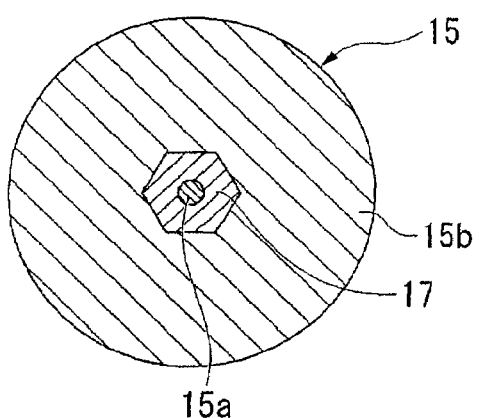
FIGS. 7B to 7D are cross-sectional views illustrating examples in which an emitted light confining waveguide part is modified in polygonal shapes.
Figure 7C:
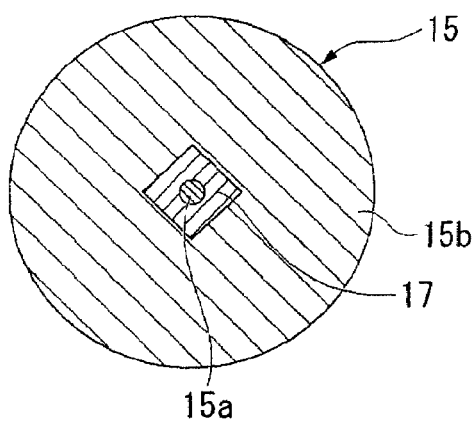
Figure 7D:
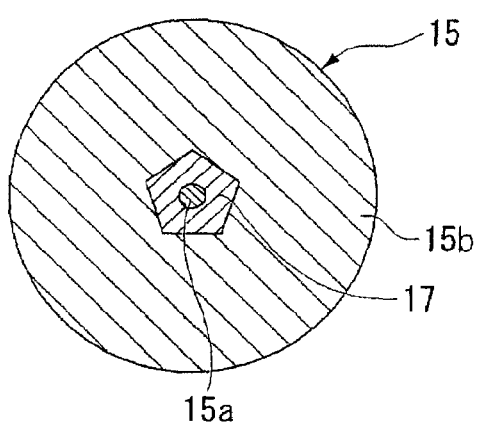

Further, in the multi-port coupler 11 as illustrated in FIG. 5, the core 15a of the bridge fiber 15 and the emitted light confining waveguide part 17 provided around the core 15a have a section of a concentric circle shape as illustrated in FIG. 7A, respectively. However, the present invention is not limited to the emitted light confining waveguide part 17 of FIG. 7A. The emitted light confining waveguide part 17 can have a section of a polygonal shape such as a hexagonal shape as illustrated in FIG. 7B, a square shape as illustrated in FIG. 7C, or a pentagonal shape as illustrated in FIG. 7D. Also in the case where the sectional shape of the emitted light confining waveguide part 17 is the polygonal shape, reflected light is confined in the core 15a of the bridge fiber 15 and is coupled to the signal fiber 12 and power incident into the pumping fibers 13 can be reduced as in the concentric circle shape.

If the outer diameter of the emitted light confining waveguide part 17 is smaller than the outer diameter (or cladding diameter) of the signal fiber 12 connected to the multi-port coupler 11 when the section of the emitted light confining waveguide part 17 has the polygonal shape, it means that the diameter of an inscribed circle of the emitted light confining waveguide part 17 is smaller than the outer diameter of the signal fiber 12. As the emitted light confining waveguide part 17 is included within a cladding area of the signal fiber 12 in a total sectional area, a whole of emitted light confined within the emitted light confining waveguide part 17 is supplied to the signal fiber 12 and a coupler front end controls the emitted light to be supplied to the pumping fiber 13, such that the same desired effect can be achieved.

As the emitted light confining waveguide part 17 is provided around the core 15a of the bridge fiber 15 also in the multi-port coupler 11 of this embodiment, pumping light from the pumping fiber 13 can be efficiently gathered in a core 16a of a cladding pump fiber 16. In the case of optical amplification by the cladding pump fiber 16, it is very important that the pumping light uniformly distributed to the cladding is efficiently absorbed by the core 16a. If the pumping light can be gathered in the core 16a, the pumping light can be efficiently absorbed (since the absorption happens only in the core).

Figure 8:
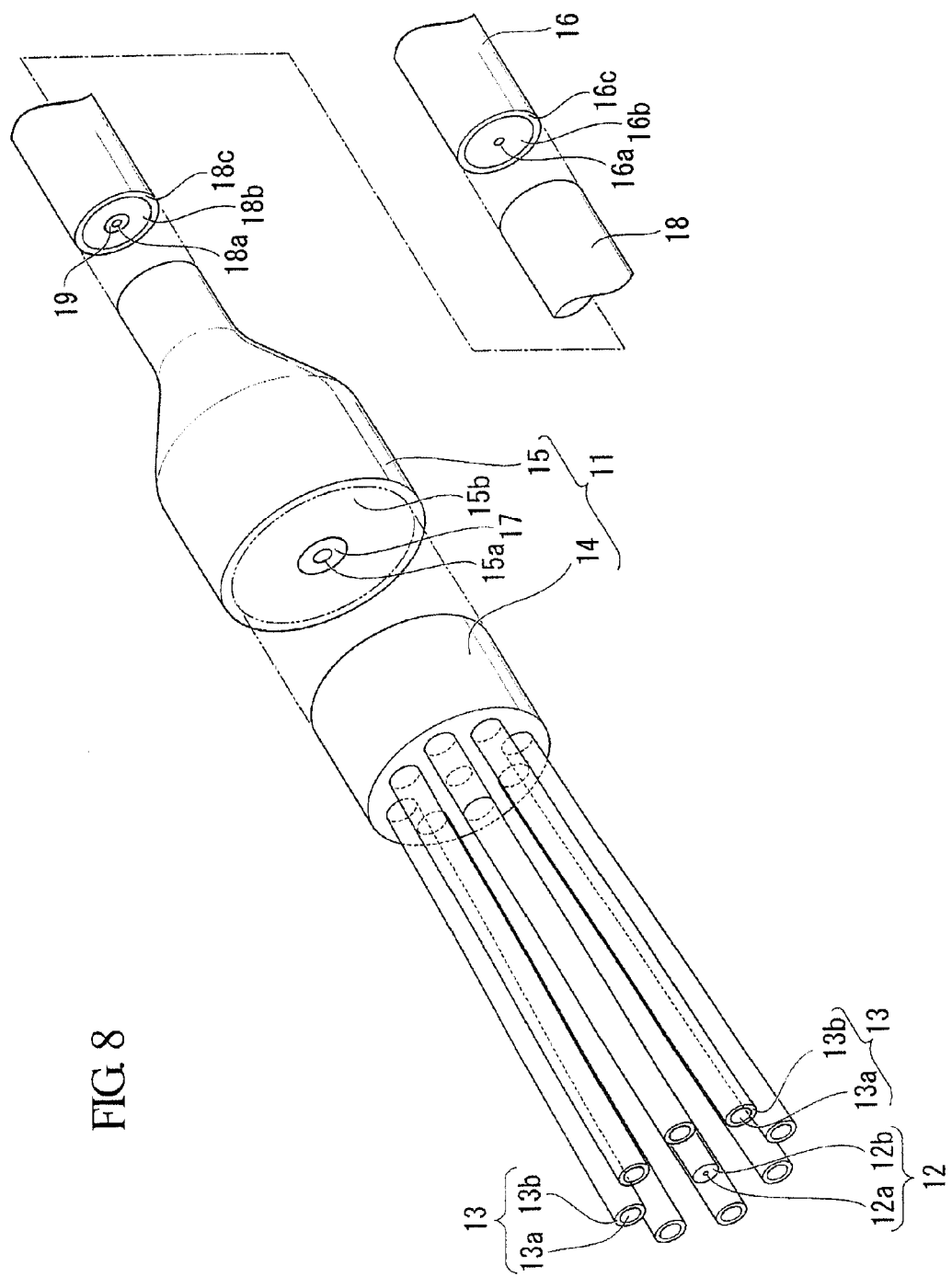
FIG. 8 is an exploded perspective view illustrating a structure in which the multi-port coupler is connected to a non-dope double cladding fiber (DCF)

In an example as illustrated in FIG. 5, the cladding pump fiber 16 connected to the multi-port coupler 11 uses a double cladding fiber (DCF) in which a rare earth element is added to the core 16a and an inner cladding 16b and an outer cladding 16c are provided around the core 16a. Alternatively, it is effective that the multi-port coupler 11 of this embodiment is connected to a cladding pump fiber (or non-dope DCF) 18 in which no rare earth element is added to a core 18a as illustrated in FIG. 8. In an example of this structure, the rare earth element doped DCF 16 is connected to an end of one side of the non-dope DCF 18 and a reduced-diameter front end of the bridge fiber 15 is connected to an end of the other side of the non-dope DCF 18.

In this case, an emitted light confining waveguide part 19 should be provided between the core 18a and claddings 18b and 18c to confine emitted light in the core 18a without emitting the light from a splicing point of the non-dope DCF 18 and the rare earth element doped DCF 16 to the claddings 18b and 18c of the non-dope DCF 18. The emitted light confining waveguide part 19 has a higher refractive index than the claddings 18b and 18c and a lower refractive index than the core 18a. A sectional shape of the emitted light confining waveguide part 19 can be a concentric circle shape and a polygonal shape relative to the core 18a. In this structure compared with the structure in which the multi-port coupler is directly connected to a rare earth element doped DCF, the multi-port coupler, the multi-port coupler can suppress the incidence of the reflected light to the pumping fiber 13 at the exactly same level.

The pump LD can be effectively prevented from being damaged by reflected light and also pumping light can be efficiently distributed around a core, by providing an area in which light is confined around the core in a waveguide structure inside the multi-port coupler as described above. In addition, the pumping light can be efficiently gathered around the core by adopting the above described structure.

EXAMPLES

The effect of suppressing the destruction of an LD was examined by applying the multi-port coupler of the present invention (as illustrated in FIG. 3) to an optical amplifier of an excitation wavelength of 915 nm and a signal wavelength of 1064 nm.

An Yb doped double cladding fiber was used as a cladding pump fiber.

In the dimensions of the fiber, the core diameter is 20 μm, the relative refractive index difference Δ between the core and the inner cladding is 0.1%, and the outer diameter of the inner cladding is 400 nm.

Further, six pump LDs having the wavelength of 915 nm and the output power of 5 W were used.

In the pumping fiber connected to the pump LD, the core diameter is 105 μm and the relative refractive index difference Δ between the core and the cladding is 0.55%.

In this case, a reflection point was located before the optical amplifier and about 5% of light output from the optical amplifier was set to return to the optical amplifier. In this structure, experimentation was performed with a multi-port coupler manufactured in the core diameter of 2.5 μm, the diameter of the emitted light confining waveguide part of 30 μm, and the relative refractive index difference of the emitted light confining waveguide part of 0.1% in accordance with the present invention and two couplers without the emitted light confining waveguide part.

As a result, four of six pump LDs were damaged and disabled upon starting experimentation when the couplers without the emitted light confining waveguide part were used.

On the other hand, when the coupler of the present invention with the emitted light confining waveguide part was used, no LD failed although reflected light was continuously input over one or more hours.

Figures 9A, 9B:
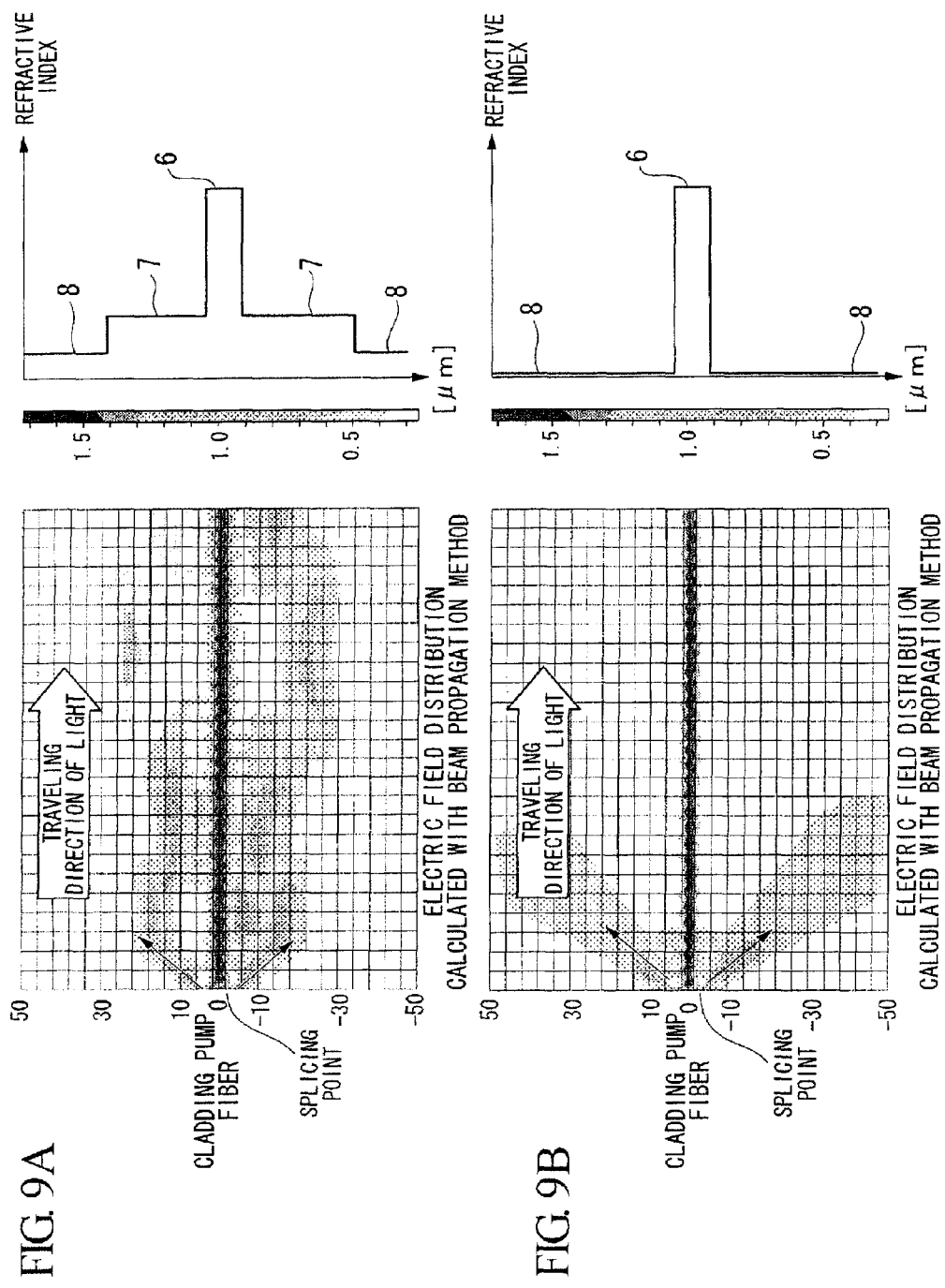
FIG. 9 is graphs illustrating results of Examples.

According to results checked in a computer, the emitted light was apparently confined and the LD was protected in the coupler provided with the emitted light confining waveguide part (FIG. 9A) compared with the coupler without the emitted light confining waveguide part (FIG. 9B), as illustrated in FIG. 9.

Next, an embodiment in which the emitted light confining waveguide part 17 of the hexagonal shape as illustrated in FIG. 7B is provided in the multi-port coupler 11 as illustrated in FIGS. 5 and 6 will be described.

In the bridge fiber 15 having the cladding 15b of the outer diameter of 400 μm and the core 15a of the diameter of 7 μm, the emitted light confining waveguide part 17 of 45 μm was formed on a side around the core 15a. In the bridge fiber 15, the relative refractive index difference between the emitted light confining waveguide part 17 and the cladding 15b was 0.1% and the relative refractive index difference between the core 15a and the emitted light confining waveguide part 17 was 0.18%. When the outer diameter of the emitted light confining waveguide part 17 is approximated to the diameter of a circle between the inscribed circle of the hexagon shape and the circumscribed circle, the outer diameter of the emitted light confining waveguide part 17 becomes 42 μm. The cladding pump fiber 16 having the core diameter of 30 μm and the relative refractive index difference of 0.12% between the core and the cladding was prepared. Upon determining how much emitted light was confined in a splicing point between the bridge fiber 15 and the cladding pump fiber 16, 95% or more of the emitted light could be confined in the core 15a of the bridge fiber 15.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A multi-port coupler for coupling a pumping light source to a cladding pump fiber for optical amplification, comprising:
a central signal fiber and a plurality of pumping fibers arranged around the central signal fiber, the central signal fiber and the plurality of pumping fibers being unified and a front side is reduced in diameter,
wherein an emitted light confining waveguide part is provided around a core of the signal fiber located at the center, and
the emitted light confining waveguide part whose outer diameter is larger than that of the core has a higher refractive index than a cladding and a lower refractive index than the core and the emitted light confining waveguide part is formed continuously from a splicing point of the cladding pump fiber to a coupler front end branched into multiple fibers.

2. The multi-port coupler of claim 1, wherein the emitted light confining waveguide part is provided in a concentric circle shape around the core of the signal fiber.

3. The multi-port coupler of claim 1, wherein the emitted light confining waveguide part is provided in a polygonal shape around the core of the signal fiber.

4. A multi-port coupler for coupling a pumping light source to a cladding pump fiber for optical amplification, comprising:
a central signal fiber and a plurality of pumping fibers arranged around the central signal fiber, the central signal fiber and the plurality of pumping fibers being unified using a capillary, the capillary being connected to a rear end of a bridge fiber along with the signal fiber and the pumping fibers, a front side of the bridge fiber being reduced in diameter,
wherein an emitted light confining waveguide part is provided around a core of the bridge fiber,
the emitted light confining waveguide part, whose outer diameter is larger than that of the core and smaller than that of a cladding of the signal fiber, has a higher refractive index than a cladding of the bridge fiber and a lower refractive index than the core, and
the capillary whose refractive index is lower than that of a cladding of the signal fiber, the capillary having an effect of confining emitted light in the signal fiber.

5. The multi-port coupler of claim 4, wherein the emitted light confining waveguide part is provided in a concentric circle shape around the core of the bridge fiber.

6. The multi-port coupler of claim 4, wherein the emitted light confining waveguide part includes a section of a polygonal shape around the core of the bridge fiber.

7. A multi-port coupler for coupling a pumping light source to a cladding pump fiber for optical amplification, comprising:
a central signal fiber and a plurality of pumping fibers arranged around the central signal fiber, the central signal fiber and the plurality of pumping fibers being unified using a capillary, the capillary being connected to a rear end of a bridge fiber along with the signal fiber and the pumping fibers, a front side of the bridge fiber being reduced in diameter, wherein an emitted light confining waveguide part is provided around a core of the bridge fiber, the emitted light confining waveguide part whose outer diameter is larger than that of the core has a higher refractive index than a cladding and a lower refractive index than the core, the capillary whose refractive index is equal to that of a cladding of the signal fiber, and an pumping fiber cladding whose refractive index is lower than that of the capillary, the pumping fiber cladding having an effect of confining emitted light in the signal fiber and the capillary.

8. The multi-port coupler of claim 7, wherein the emitted light confining waveguide part is provided in a concentric circle shape around the core of the bridge fiber.

9. The multi-port coupler of claim 7, wherein the emitted light confining waveguide part includes a section of a polygonal shape around the core of the bridge fiber.

10. The multi-port coupler of claim 1, wherein the outer diameter of the emitted light confining waveguide part is smaller than that of the signal fiber connected to the multi-port coupler.

11. A multi-port coupler, for coupling a pumping light source to a cladding pump fiber for optical amplification, comprising:

a central signal fiber and a plurality of pumping fibers arranged around the central signal fiber, the central signal fiber and the plurality of pumping fibers being unified and a front side is reduced in diameter, wherein an emitted light confining waveguide part is provided around a core of the signal fiber located at the center, the emitted light confining waveguide part, whose outer diameter is larger than that of the core, has a higher refractive index than a cladding and a lower refractive index than the core, and the emitted light confining waveguide part is formed continuously from a splicing point of the cladding pump fiber to a coupler front end branched into multiple fibers, and an emitted light attenuation part is provided in which the signal fiber is extended for an appropriate distance and rolled.

12. An optical amplifier, comprising:

the multi-port coupler of claim 1;

a cladding pump fiber for optical amplification; and an pumping light source.

13. A fiber laser, comprising:

the multi-port coupler of claim 1;

a cladding pump fiber for optical amplification; and an pumping light source.

* * * * *